June 5, 1923.

E. WANDERSLEB 1,457,802

EXPOSURE METER

Filed Aug. 29, 1921

Inventor:

Patented June 5, 1923.

1,457,802

UNITED STATES PATENT OFFICE.

ERNST WANDERSLEB, OF JENA, GERMANY, ASSIGNOR TO THE FIRM OF CARL ZEISS, OF JENA, GERMANY.

EXPOSURE METER.

Application filed August 29, 1921. Serial No. 496,728.

(GRANTED UNDER THE PROVISIONS OF THE ACT OF MARCH 3, 1921, 41 STAT. L., 1313.)

*To all whom it may concern:*

Be it known that I, ERNST WANDERSLEB, a citizen of the German Empire, and residing at Jena, Germany, have invented a new and useful Exposure Meter (for which I have filed an application in Germany October 25, 1915, and in Austria February 10, 1916), of which the following is a specification.

The invention relates to an exposure meter, which allows of determining the luminosity from the time required by a sensitive paper for growing dull to match a certain comparison colour by the effect of light.

According to the invention the new exposure meter is provided with a reflector system, allowing of observing from the side or the back of the exposure meter the part of the front surface of the sensitive paper, which is to be exposed to the light. The latter may thus be used at such places where the paper could not be observed from the front of the exposure meter; it is, therefore, possible to fit the exposure meter close behind a telescope or to use it in the ground glass plane of a camera.

For observing the sensitive paper it is preferable to use a collective system of short focal length. The importance of this system not only consists in its magnifying effect but especially in the fact that the observer, when looking in the collective system keeps off any light even coming from behind. The collective system may consist of a collective lens of short focus; or by using instead of this collective lens a concave mirror, the latter forms by itself part of the reflector system and possibly any other mirrors may then even be dispensed with.

Figure 1:
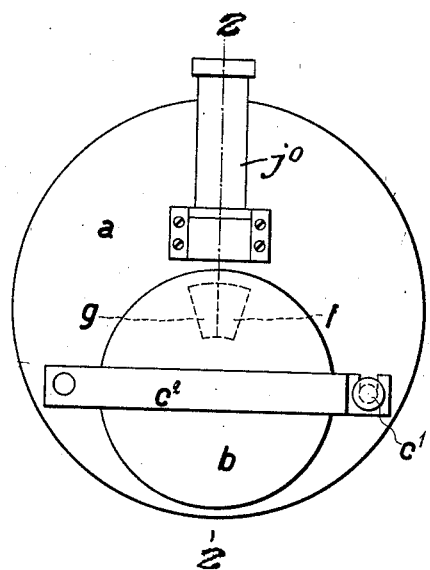
Figure 2:
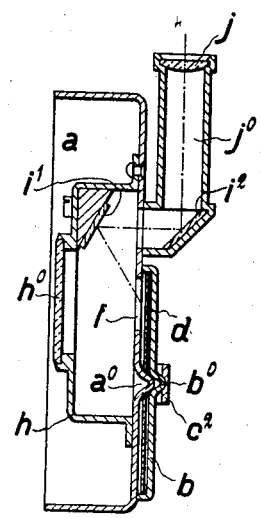
Figure 3:
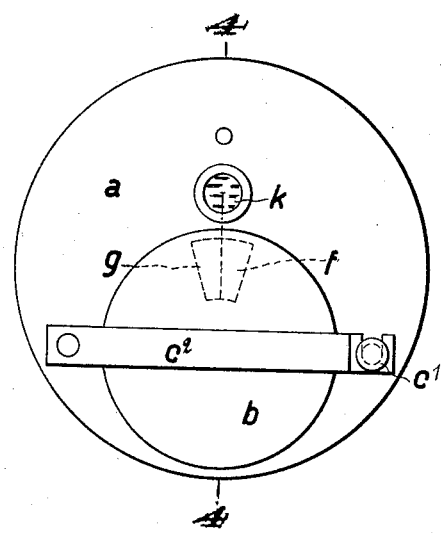
Figure 4:
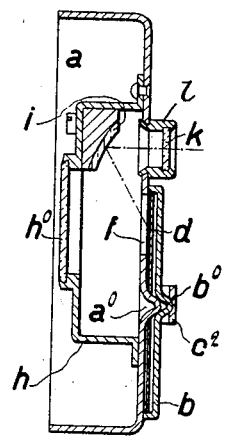

The invention is illustrated in the drawing by two constructional examples. Fig. 1 is a plan elevation of a device according to the invention. Fig. 2 is a section on the line 2—2 of Fig. 1. Fig. 3 is a plan elevation of a second device. Fig. 4 is a section on the line 4—4 of Fig. 3.

In the first example (Figs. 1 and 2) a tincasing $a$ is provided with an elevation $a^0$ on which rotates a flat tin-bowl $b$ with a recess $b^0$. By means of a bolting device, consisting of a knob $c^1$ and a rotatable hook $c^2$, the bowl $b$ is kept in a detachable position. Inside the bowl $b$ there is a small piece $d$ of sensitive paper. An opening $f$ of the casing $a$ serves for transmitting light to the piece of sensitive paper, lying near this opening at any time. A field $g$, which is beside the said opening, is spread over with the colour of comparison. A body $h$ fixed in the casing $a$ is provided in front with a glass window $h^0$ and carries a small, obliquely disposed plane mirror $i^1$. A second plane mirror $i^2$ is fitted to the casing $a$. Above the mirror $i^2$ there is a small tube $j^0$, carrying at its top end a collective lens $j$.

The second example (Figs. 3 and 4) only differs from the first one inasmuch as in the same the reflector system is formed solely by a concave mirror $i$, playing at the same time the part of the collective system. By means of a plane-parallel disc $k$ the device is protected against the entrance of dust through the small tube $l$, serving for observation purposes.

I claim:

1. In an exposure meter a casing adapted to receive a piece of sensitive paper and having an opening for transmitting light to this paper, which casing contains a field in the vicinity of this paper, coated with a comparison colour, and a reflector system for observing this paper and the said field, lying without the rays of light which are to be transmitted to the paper, the said casing having an opening of inspection located in one of the sides of the casing, which does not contain the said light transmitting opening.

2. In an exposure meter a casing adapted to receive a piece of sensitive paper and having an opening for transmitting light to this paper, which casing contains a field in the vicinity of this paper, coated with a comparison colour, and an optical system adapted to deflect the rays reflected by this paper and the said field and comprising a collective system of short focus, this optical system allowing of observing the paper and the field, the said casing having an opening of inspection located in one of the sides of the casing, which does not contain the said light transmitting opening.

3. In an exposure meter a casing adapted to receive a piece of sensitive paper and having an opening for transmitting light to this paper, which casing contains a field in the vicinity of this paper, coated with a comparison colour, and a concave mirror for observing this paper and the said field, the said casing having an opening of inspection located in one of the sides of the casing, which does not contain the said light transmitting opening.

ERNST WANDERSLEB.